UNITED STATES PATENT OFFICE.

JOHN B. SLOAN, OF PHILADELPHIA, PENNSYLVANIA.

IMPROVEMENT IN MEDICAL COMPOUNDS.

Specification forming part of Letters Patent No. 152,017, dated June 16, 1874; application filed April 23, 1874.

*To all whom it may concern:*

Be it known that I, JOHN B. SLOAN, of the city and county of Philadelphia, in the State of Pennsylvania, have invented a certain Compound, called Lactophosphate of Lime, Iron, and Cod-Liver Oil, of which the following is a specification:

This invention relates to a medical compound used for the treatment of debility, coughs, colds, and general diseases of the lungs.

The compound consists of the following ingredients, in the proportions stated: Lactic acid, eight ounces; phosphate of lime, eight ounces; gum-arabic, sixteen ounces; sugar, sixteen ounces; glycerine, twelve ounces; cod-liver oil, two quarts; lime-water, one pint; pyrophosphate of iron, two and a half ounces; oil of myrrhbane, one-half ounce.

Dissolve the phosphate of lime in the lactic acid. Mix the gum-arabic and sugar in a mortar, and add this mixture to the prepared lactophosphate of lime, and then gradually and thoroughly mix the cod-liver oil with the above. Dissolve the iron, which may be in a pyrophosphate state or otherwise, in the glycerine and lime-water, and add the product to the other mixture; and, lastly, flavor the compound with the oil of myrrhbane, or other flavoring material to suit the taste. The composition is then fit for use.

I have in practice found the proportions above given to answer well; but I do not confine myself to these proportions, as other proportions will answer the purpose.

I claim as my invention—

A compound consisting of the above-named ingredients, substantially as and for the purpose specified.

JOHN B. SLOAN.

Witnesses:
THOMAS J. BEWLEY,
STEPHEN USTICK.